US005224045A

United States Patent [19]

Stasell

[11] Patent Number: 5,224,045

[45] Date of Patent: Jun. 29, 1993

[54] AUTOMOTIVE VEHICLE MICROPROCESSOR CONTROL HAVING GRADE-HOLDER VEHICLE SPEED CONTROL

[75] Inventor: Mark W. Stasell, Fort Wayne, Ind.

[73] Assignee: Navistar International Transportation Corp., Chicago, Ill.

[21] Appl. No.: 618,762

[22] Filed: Nov. 27, 1990

[51] Int. Cl.[5] .................... G06F 15/20; F02D 41/26

[52] U.S. Cl. .................... 364/431.07; 364/426.04; 123/352; 180/179; 180/176

[58] Field of Search .................... 364/431.07, 431.05, 364/426.04; 123/352; 180/179, 176

[56] References Cited

U.S. PATENT DOCUMENTS

| | | | |
|---|---|---|---|
| 4,211,193 | 7/1980 | Cox et al. | 123/352 |
| 4,419,729 | 12/1983 | Krieder | 364/426.04 |
| 4,467,428 | 8/1984 | Caldwell | 364/426.04 |
| 4,493,303 | 1/1985 | Thompson et al. | 123/357 |
| 4,914,597 | 4/1990 | Moncelle et al. | 364/426.04 |
| 5,121,324 | 6/1992 | Rini et al. | 364/426.04 |

*Primary Examiner*—Vincent N. Trans
*Attorney, Agent, or Firm*—Dennis K. Sullivan

[57] ABSTRACT

A microprocessor engine control for a diesel engine powered truck is provided with a grade-holder vehicle speed control by another algorithm that is effective to cause the engine operation to move from one horsepower vs. speed curve to another when the vehicle encounters a change in load, such as when the vehicle encounters a change in grade.

5 Claims, 2 Drawing Sheets

AUTOMOTIVE VEHICLE MICROPROCESSOR CONTROL HAVING GRADE-HOLDER VEHICLE SPEED CONTROL

FIELD OF THE INVENTION

This invention relates generally to automotive vehicles that are powered by internal combustion engines, such as highway tractors and heavy trucks for example. More specifically, it relates to microprocessor-based engine controls for such vehicles.

BACKGROUND AND SUMMARY OF THE INVENTION

Microprocessor-based controls are used with automotive vehicle engines to perform various functions. The invention relates to an algorithm for the microprocessor that enables a vehicle to maintain, or hold, speed on a grade. While this might at first blush appear to be a speed control or cruise control function, this grade-holder speed control aspect of the invention is conceptually different from the usual speed control or cruise control because it operates without the driver being required to invoke a speed control or cruise control mode of operation for the vehicle.

A diesel engine which comprises electronic speed governing has the ability to operate on any particular one of a number of different horsepower vs. speed curves. The grade-holder speed control of the present invention comprises an algorithm in the microprocessor which is effective to switch the engine operation from a lower horsepower vs. speed curve to a higher one when an increase in road grade which initiates an incipient reduction in vehicle road speed is detected. The algorithm causes the engine operation to switch to a higher horsepower vs. speed curve so that vehicle speed is maintained despite the increase in grade. In this way it is possible to improve the fuel economy by allowing the vehicle to operate on a more economical, lower horsepower vs. speed curve for level road conditions (i.e., zero grade), yet to operate along higher horsepower vs. speed curves on increasing grades. Driveability is also improved because fewer downshifts will be required.

One advantage of the grade-holder speed control of the present invention is that it can be implemented on certain known vehicle systems without hardware modifications, the only modification being a software change. It can also respond to other factors that change the load on the vehicle, such as a headwind for instance.

BRIEF DESCRIPTION OF THE DRAWINGS

Further features, advantages, and benefits of the invention, along with those already enumerated, will be seen in the ensuing description which is accompanied by drawings. The drawings disclose a presently preferred embodiment of the invention according to the best mode contemplated at the present time in carrying out the invention. In the drawings.

DESCRIPTION OF THE PREFERRED EMBODIMENT

Figure 1:
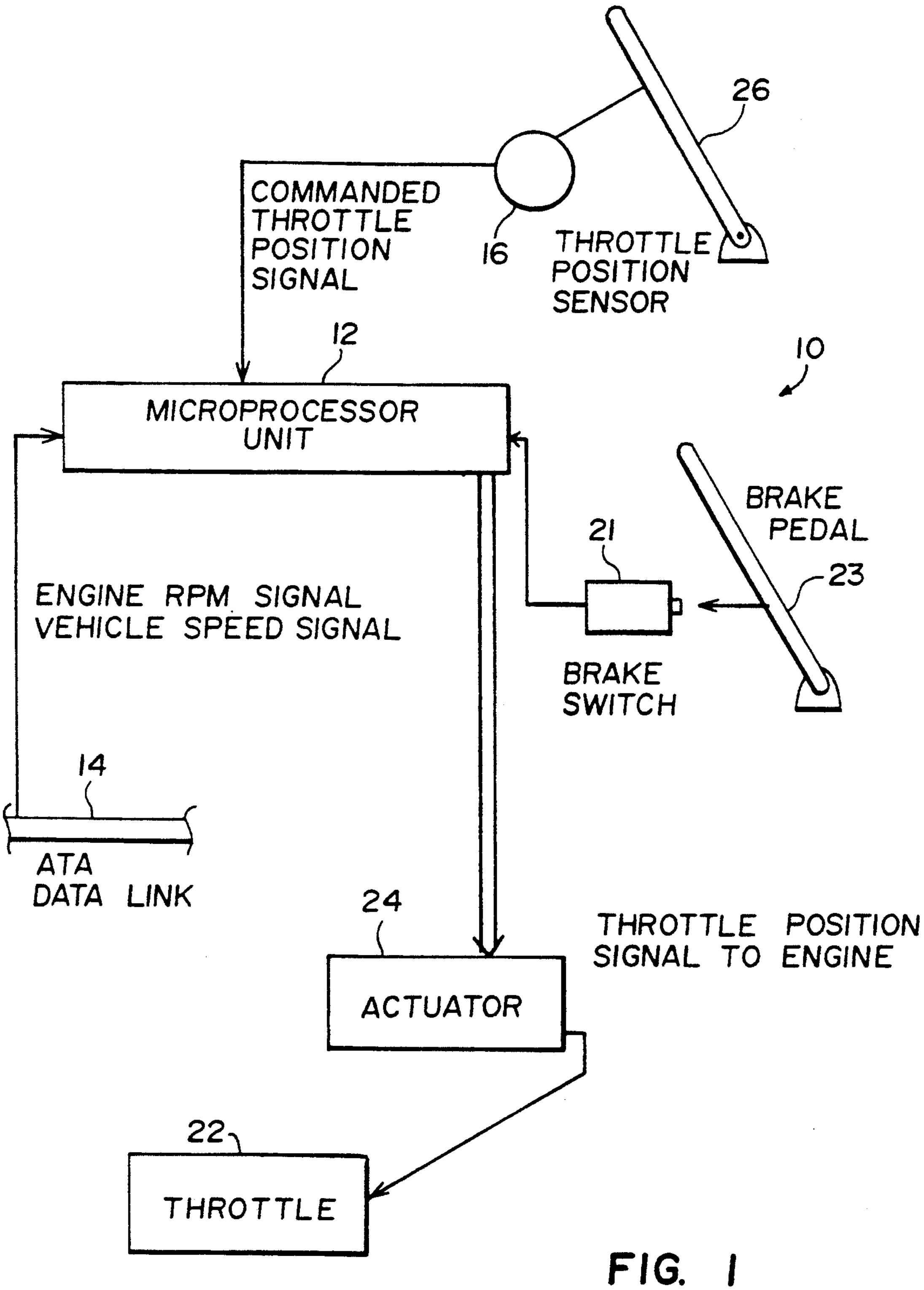
FIG. 1 is a block diagram illustrating a microprocessor based engine control system comprising the grade-holder vehicle speed control of the present invention.

FIG. 1 shows a vehicle engine control system 10 which comprises: a microprocessor unit 12; an ATA data link 14; a throttle position sensor 16; and a brake position switch 21. Microprocessor unit 12 controls various functions, including the setting of an engine throttle 22 by means of an actuator 24.

ATA data link 14 is part of a conventional on-board communication system, associated with microprocessor unit 12, that provides certain data in electronic format for use by devices, including microprocessor unit 12, that are on the data link. The microprocessor unit is also conventional hardware. A typical system already provides engine speed information and vehicle road speed information on the data link for use by the microprocessor unit, and vehicle road speed input is also utilized by the microprocessor unit in putting the present invention into practice. Vehicle road speed is typically derived from a sensor, such as a wheel speed pick-up.

Sensor 16 is a conventional electromechanical transducer that is placed in association with a conventional accelerator pedal 26 by which the driver of the vehicle operates throttle 22. Sensor 16 has an input that is linked to pedal 26 and an output that is electrically coupled with microprocessor unit 12. The sensor operates to deliver to the microprocessor unit an electrical input that represents a throttle position (throttle setting) that is desired by the driver. The microprocessor unit acts upon the command from sensor 16 to cause actuator 24 to position the throttle in a manner that tracks the positioning of pedal 26 by the driver. This form of throttle operation is conventional technology in a modern electronically controlled diesel engine.

Figure 2:
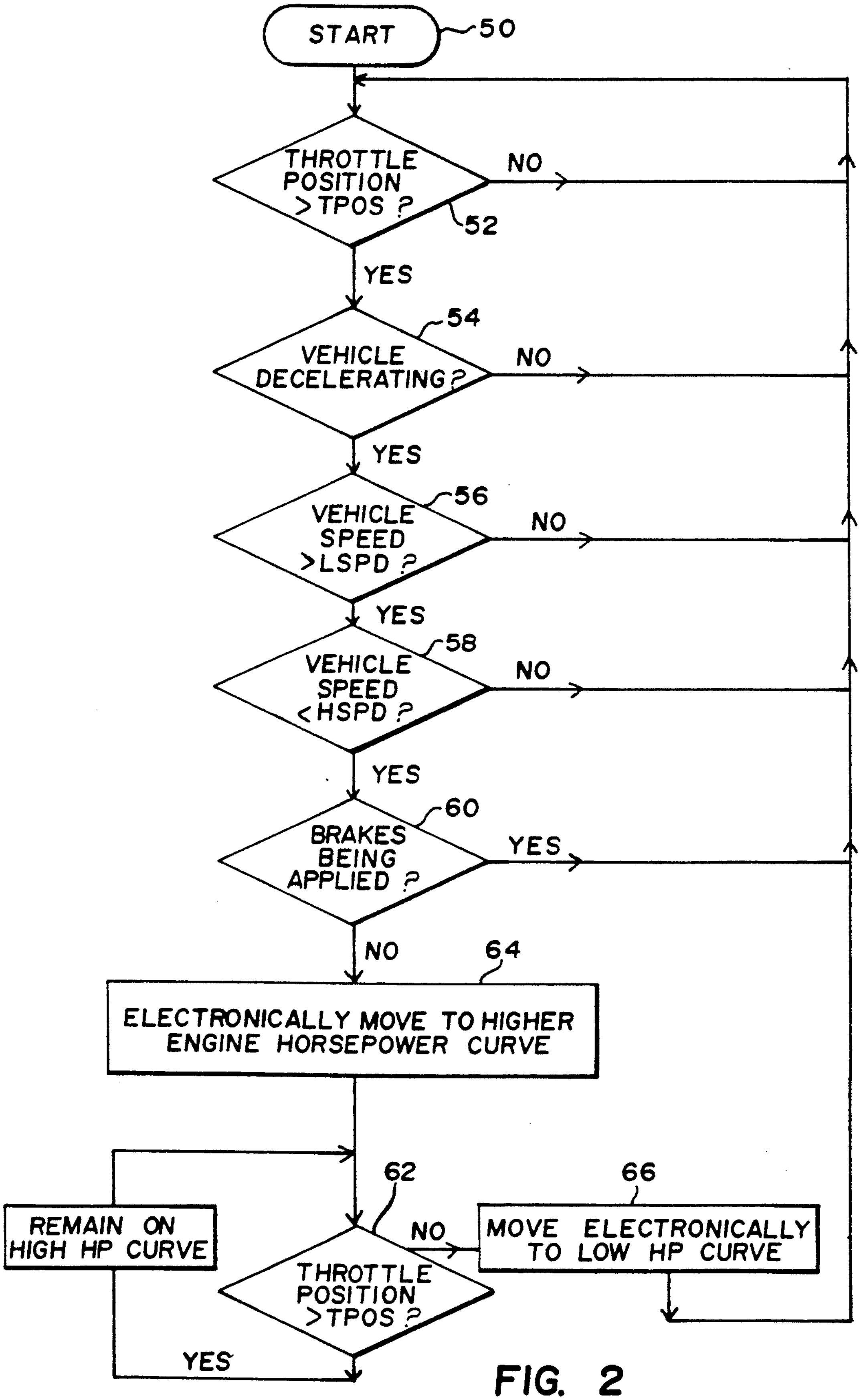
FIG. 2 is a flow diagram for the algorithm that is used to accomplish grade-holder vehicle speed control.

Having described the hardware that is present in the engine control system, attention can now be directed to the operation of microprocessor unit 12. FIG. 2 portrays a flow diagram that illustrates the details of operation of the grade-holder vehicle speed control feature of the present invention. The flow diagram represents a presently preferred algorithm for the performance of this control function in a situation where the engine encounters an increased load, such as when the vehicle encounters an increase in road grade. The microprocessor is programmed in accordance with conventional procedures to implement this algorithm.

The illustrated algorithm comprises: a start 50; decision points (decision blocks) 52, 54, 56, 58, 60, and 62; and command points (command blocks) 64 and 66. Each time that microprocessor unit 12 calls the algorithm, the throttle position that is being commanded by the driver via accelerator pedal 26 is first checked to see if it is within a certain range. This check is performed by having microprocessor unit 12 read sensor 16. If decision block 52 finds that the commanded throttle position is for a throttle setting greater than a certain setting TPOS (meaning that the commanded throttle position is within a range commanding the throttle to be within a predetermined range of maximum throttle setting, say 90% to 100% of maximum setting, then the algorithm proceeds to have decision block 54 check for vehicle deceleration. If however decision block 52 finds that the commanded throttle position is not within that range, further execution of the algorithm is terminated, and the algorithm will be reset to await its next call by the microprocessor.

Vehicle deceleration can be calculated in the usual way by subtracting the most recent vehicle speed reading from the preceding reading and dividing by the time difference between the two readings. If decision block 54 finds that the velocity has changed by greater than a certain amount, this is deemed a sufficient deceleration to allow the algorithm to proceed to the next decision block 56. But if the deceleration is insufficient, then further execution of the algorithm is terminated, and the algorithm will be reset to await its next call by the microprocessor.

Decision block 56 determines if the vehicle speed is exceeding a certain low speed LSPD. This is done by reading the speed information on data link 14. If the condition is satisfied, then the algorithm proceeds to decision block 58 which will determine if vehicle speed is also less than a certain high speed HSPD; otherwise the algorithm is reset to await the next call by the microprocessor. If speed is also found less than HSPD, then the algorithm will proceed to execute decision block 60. If speed is not found to be less than HSPD, then further execution of the algorithm is terminated, and the algorithm will be reset to await its next call by the microprocessor.

Decision block 60 determines if the vehicle's brakes are being applied by the driver. Typically the vehicle is equipped with an air or hydraulic brake system that applies a braking torque to the wheels when the driver steps on the brake pedal. One way of implementing the hardware for this decision is by association of brake position switch 21 with a conventional brake pedal 23, as represented in FIG. 1. If the brakes are being applied, then decision block 60 will terminate further execution of the algorithm, and the algorithm will be reset to await its next call by the microprocessor. If the brakes are not being applied however, decision block 60 will cause the following action to be taken as represented by command block 64.

The engine operation will move from the horsepower vs. speed curve along which it is presently operating to a higher horsepower vs. speed curve. The reason for this action is that the conditions that have been satisfied in order for the algorithm to have arrived at command block 64 represent the vehicle being subjected to increased load, for instance the increased load encountered by an increase in grade. In order to maintain vehicle speed as the vehicle climbs the grade, it is necessary to increase the engine torque output and this is done by moving to a higher horsepower vs. speed curve. The action of moving from one curve to another is accomplished in conventional fashion in an electronically governed diesel engine by the microprocessor control.

After the move to a higher horsepower vs. speed curve, the throttle position is again read. This step is represented by decision block 62. If the commanded throttle setting is still greater than the pre-programmed setting that had to be satisfied by decision block 52, the operation is allowed to continue along the higher horsepower vs. speed curve. This mode of operation continues until the commanded throttle setting ceases to exceed the pre-programmed threshhold TPOS. When the commanded throttle setting drops below TPOS, decision block 62 will cause the microprocessor unit to revert to engine operation along a lower horsepower vs. speed curve because the decreased throttle setting command indicates that the increased load which caused the move to a higher horsepower vs. speed curve has ceased. The reversion to a lower horsepower vs. speed curve represents the completion of the execution of the algorithm, and hence the algorithm is now reset to await its next call by the microprocessor.

The algorithm may be designed to operate in such a manner than when the grade-holder vehicle speed control causes the engine operation to move from a lower curve to a higher curve, the higher curve will be capable of delivering maximum engine torque consistent with speed, if needed. This means that the algorithm will cause the change to occur in a single large step, and this is a preferred algorithm design because the driver will feel the engine power surge that is produced by the single large step transition. Alternatively, the change could occur as a sequence of steps along more closely spaced curves.

An automotive vehicle microprocessor control having grade-holder vehicle speed control has been described. While the details of the disclosure relate to a presently preferred embodiment, principles of the invention may be practiced in other embodiments that are equivalent to the following claims.

What is claimed is:

1. In an automotive vehicle having a powertrain which comprises an internal combustion engine and road-engaging wheels at least some of which are driven by said engine, said engine comprising a throttle, said vehicle comprising brakes that are selectively operable to impose braking torque on said wheels and controls that are selectively operable by a driver of the vehicle comprising a brake control for selectively operating the brakes and an accelerator control for selectively operating the throttle, said vehicle further comprising a microprocessor that is operatively coupled with said powertrain such that said microprocessor can act on information comprising vehicle road speed and a throttle setting commanded by said accelerator control and can distinguish between brake application and non-application, said microprocessor also comprising means for causing said engine to operate along a particular horsepower vs. speed curve selected from a number of such curves for the engine, the improvement which comprises means effective upon the microprocessor detecting concurrence 1) of the throttle setting which is commanded by said accelerator control being within a predetermined range programmed into the microprocessor, 2) of vehicle speed being within a predetermined vehicle speed range programmed into the microprocessor, 3) of vehicle road speed changing at greater than a predetermined rate programmed into the microprocessor, and 4) of a particular status of the brakes, to cause the microprocessor to change engine operation from one of said horsepower vs. speed curves to another.

2. The improvement set forth in claim 1 wherein said means effective to cause the microprocessor to change engine operation from one of said horsepower vs. speed curves to another comprises means to cause engine operation to move from a lower horsepower vs. speed curve to a higher horsepower vs. speed curve upon the microprocessor detecting concurrence 1) of the throttle setting which is commanded by said accelerator control being within a range corresponding to throttle position being within a predetermined range of maximum throttle setting programmed into the microprocessor, 2) of vehicle speed exceeding a predetermined road speed programmed into the microprocessor, 3) of rate of change of vehicle road speed being a deceleration greater than a predetermined magnitude programmed into the microprocessor, and 4) of the brakes not being applied.

3. The improvement set forth in claim 2 including means effective to cause the microprocessor to return the engine operation to a lower horsepower vs. speed curve upon the commanded throttle setting ceasing to occupy said range corresponding to throttle position being within a predetermined range of maximum throttle setting.

4. The improvement set forth in claim 2 in which said range corresponding to throttle position being within a predetermined range of maximum throttle setting comprises a range corresponding to throttle position being within a range of about 90% to 100% of maximum throttle setting.

5. The improvement set forth in claim 4 including means effective to cause the microprocessor to return engine operation to a lower horsepower vs. speed curve upon the commanded throttle setting ceasing to occupy said range corresponding to throttle position being within a predetermined range of maximum throttle setting.

* * * * *